United States Patent [19]

Westermann

[11] 3,894,825

[45] July 15, 1975

[54] RECORD DIE TOOL

[76] Inventor: William S. Westermann, 1400 Burton Valley Rd., Nashville, Tenn. 32715

[22] Filed: Dec. 26, 1973

[21] Appl. No.: 428,083

[52] U.S. Cl. .................. 425/195; 425/810; 425/406
[51] Int. Cl.² ........................................... B29C 17/00
[58] Field of Search ............ 425/193, 195, 406, 810

[56] References Cited
UNITED STATES PATENTS

| 941,291 | 11/1909 | Wickes | 425/810 X |
|---|---|---|---|
| 1,576,642 | 3/1926 | Bishop | 425/810 X |
| 1,916,996 | 7/1933 | Somner | 425/195 |
| 2,501,823 | 3/1950 | Leedom | 425/810 X |

Primary Examiner—Francis S. Husar
Assistant Examiner—David S. Safran
Attorney, Agent, or Firm—Harrington A. Lackey

[57] ABSTRACT

A tool for positively raising and lowering the center pin holder on a record pressing die for releasing and clamping a die matrix.

A cam-shaped nut is fixed to the center pin holder within a horizontal cavity of the die. An elongated bar, wedge-shaped at one end, and preferably bifurcated, is longitudinally movable within the cavity to engage the cam-shaped nut to positively move the center pin holder up or down. When the bar is in a right-side-up position, inward longitudinal movement of the bar will force the center pin holder down to lock the matrix upon the die. When the bar is turned upside-down, inward longitudinal movement of the bar will force upward the center pin holder to release the matrix.

6 Claims, 3 Drawing Figures

RECORD DIE TOOL

BACKGROUND OF THE INVENTION

This invention relates to a record pressing die tool, and more particularly to a tool operative to hold a record die matrix upon the pressing die and to release the matrix.

In the art of pressing phonograph records, a lower die matrix plated with the grooves of a particular phonograph record is placed upon and secured to the upper face of a lower record press die or die platen. The matrix is held down upon the die by a center pin holder having an upper cap upon a cylindrical stem, the stem fitting within aligned center holes in the matrix and the die. By thrusting the center pin holder down, the cap engages the center of the matrix to hold it upon the die. The center pin holder is also provided with a coaxial floating center pin which functions to center the plastic mass for making the record upon the matrix.

Every time a different phonograph record is pressed, a new matrix must be substituted for the old. In the past there has been considerable difficulty in removing the center pin holder from the die and the matrix in order to remove the old die matrix and insert a new one.

SUMMARY OF THE INVENTION

It is therefore an object of this invention to provide a special tool adapted to positively raise the center pin holder from a die in order to remove the matrix and replace a new matrix, and for positively forcing down the center pin holder to securely hold the matrix upon the face of the die.

The tool made in accordance with this invention includes a cam-shaped nut fixed to the bottom portion of the center pin holder within a horizontal cavity intercepting the center pin holder hole and opening through one side of the die. An elongated bar is slidably received within the cavity and provided with a forked wedge-shaped end portion adapted to slide against the upper cam surface of the nut in a right-side-up position and to slide against the lower cam surface of the nut in an upside-down position. In the right-side-up position, the inward thrust of the bar forces the center pin holder down to clamp or lock a matrix upon the face of the record pressing die. In the upside-down position, the inward thrust of the bar forces upward the center pin holder, thereby releasing the matrix for removal and replacement.

DESCRIPTION OF THE PREFERRED EMBODIMENTS

Figure 1:
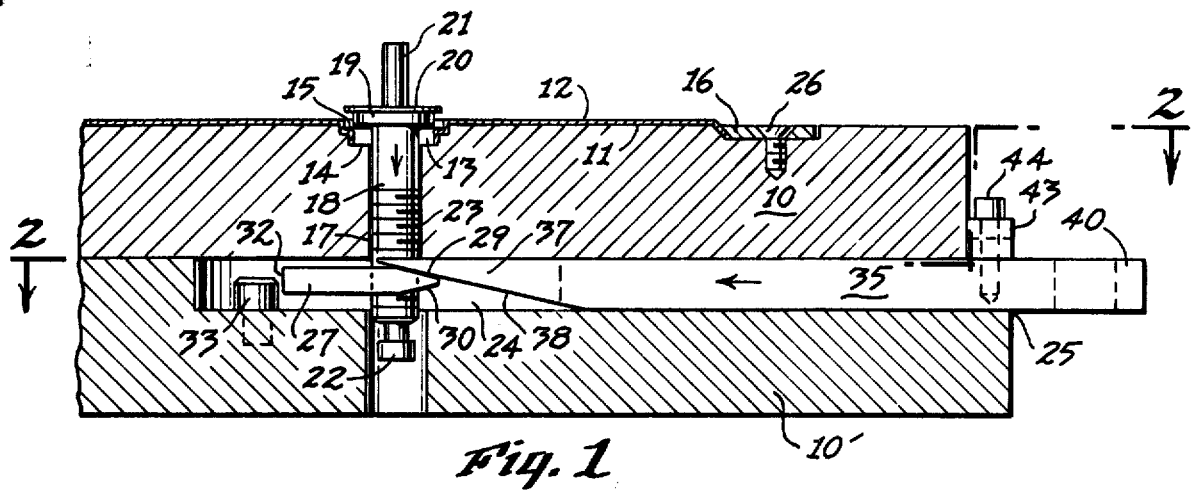
FIG. 1 is a vertical, sectional elevation taken through a lower record pressing die, and illustrating the tool in operative position for positively forcing down the center pin holder.

Referring now to the drawings in more detail, a lower record pressing die 10 and die support 10' are shown fragmentarily. The die 10 has an upper face 11 upon which is supported a thin metal matrix 12 having phonograph grooves, not shown, in the face thereof. The matrix 12 has a downwardly projecting, inner, cylindrically shaped rim or hub 13 adapted to fit in a corresponding recess 14 in the center of the die 10. The matrix 12 may have an annular off-set ledge 15 connecting the rim 13 with the face of the main body of the matrix 12. The outer rim of the matrix 12 is held upon the die face 11 by clamp ring 16 and screws 26.

Freely mounted for vertical reciprocal movement within the center hole 17 of the die 10 is a cylindrical center pin holder 18. Fixed to the top of the center pin holder 18 is a cap member 19, including a cap disc 20. The body of the cap member 19 is cylindrical and adapted to be received within the cavity 14, while the cap disc 20 is adapted to seat upon the annular ledge 15 of the matrix 12.

The center pin holder 18 is also provided with a conventional coaxial, vertically reciprocal, floating center pin 21.

Depending coaxially from the center pin holder 18 is a bottom end member 22.

The lower portion 23 of the center pin holder 18 is threaded and depends into a horizontal, elongated cavity 24 between the die 10 and die support 10'. The cavity 24 intercepts the center hole 17 and is provided with an entrance opening 25 in one side of the die 10 and die support 10'. The die 10 and die support 10' could be combined in a unitary die if desired. The cavity 24 could also be formed in either the die 10 or the die support 10', depending upon the relative dimensions.

A nut member 27 has a threaded opening 28 therethrough for threadedly engaging the threaded lower portion 23 of the center pin holder 18.

One end of the nut member 27 has an upper cam face 29 declining toward the entrance opening 25, and a lower cam face 30 inclining toward the entrance opening 25, so that the upper and lower cam faces 29 and 30 converge toward the outer end of the nut member 27 pointing toward the entrance opening 25.

The opposite or inner end 32 of the nut member 27 is adapted to abut against the head of a stop bolt or pin 33 adjacent the closed end of the cavity 24. Stop bolt 33 is so positioned that when the inner end 32 abuts the stop bolt 33, the threaded opening 28 is substantially coaxially aligned with center pin holder 18, so that the center pin holder 18 may be inserted through the cavity 14, down through the center hole 17 and threaded through the opening 28 of the nut member 27. In other words, the stop bolt 33 is an alignment device for the nut member 27.

The elongated operator or wedge bar 35 preferably has a length greater than the distance between the entrance opening 25 and the center hole 18, and is adapted to be freely received for horizontal, reciprocal, longitudinal movement within the cavity 24.

The inner operative end of the bar 35 is wedge-shaped, and preferably bifurcated to form the fingers or tines 36 and 37. The fingers 36 and 37 are identical having top surfaces which are coplanar with the top surface of the bar 35 in its right-side-up position in FIG. 1, The bottom surfaces 38 of both fingers 36 and 37 are coplanar with each other and incline gradually inward until they merge with the upper surfaces of the fingers 36 and 37. The outer or handle end portion 40 of the bar 35 is adapted to be manually gripped, or coupled, such as by hole 41, to another tool, such as a screw driver, for moving the elongated bar 35 longitudinally and reciprocably within the cavity 24 toward and away from the nut member 27.

Figure 2:
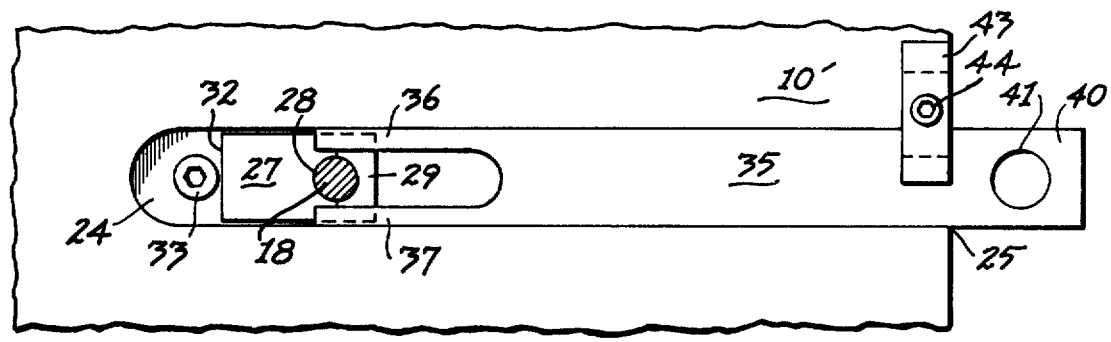
FIG. 2 is a fragmentary section taken along the line 2—2 of FIG. 1.

In the operation of this tool, the center pin holder 18 is removed from the center hole 17, while a particular record matrix 12 is centered and placed upon the upper face 11 of the pressing die 10. As the center pin holder 18 descends through the hole 17, the bottom end member 22 is inserted into the substantially aligned threaded opening 28. If the threaded opening 28 is slightly off center, the bottom end member 22, being of smaller diameter than the threaded opening 28, will shift the nut member 27 in a direction causing the threaded opening 28 to become more nearly coaxially aligned with the pin holder 18. By the time the threaded lower portion 23 has descended into engagement with the threaded opening 28, the two threaded parts 23 and 28 are truly aligned. The center pin holder 18 is then turned to screw the pin holder 18 into the nut member 27 until the pin holder 18 has passed through the nut member to a position, such as that disclosed in FIG. 1 and 3. The pin holder 18 is pushed down or lowered until the cap member 19 is slightly above the inner rim 13 of the matrix 12. At this point, the wedge bar 35 is thrust, in its right-side-up position disclosed in FIGS. 1 and 2, inward in the direction of the arrow of FIG. 1, so that the inclined surfaces 38 of the fingers 36 and 37 engage the top cam surface 29 of the nut 27. The continued inward thrust of the bar 35 causes the inclined surfaces 38 to cam the upper surface 29 downward, and positively force down the pin holder 18, as disclosed by the arrow in FIG. 1, until the cap member 19 is received within the inner rim 13 and the cap ledge 20 seats upon the annular ledge 15 of the matrix 12. The clamp ring 16 may then be secured against the outer rim of matrix 12.

Figure 3:
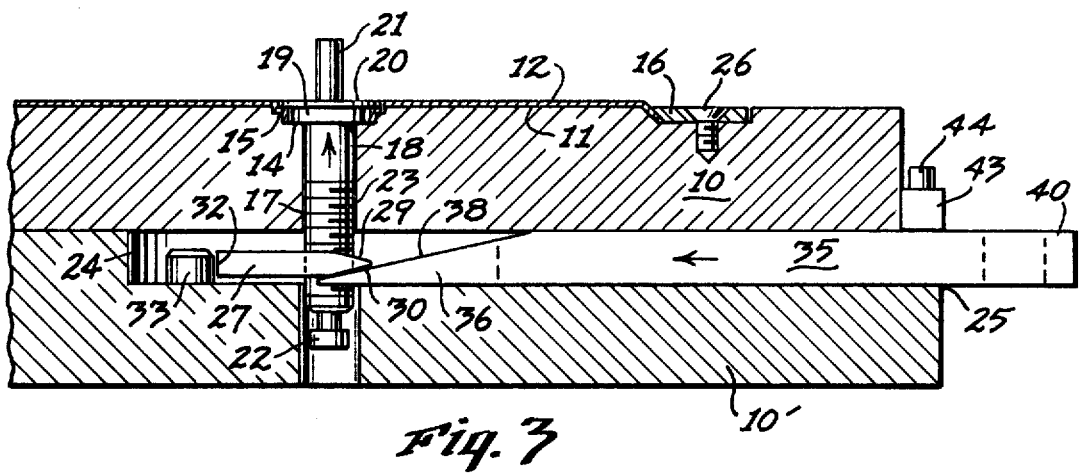
FIG. 3 is a view similar to FIG. 1, showing the tool bar in its upside-down position for positively forcing up the center pin holder.

After the desired number of records have been pressed from the matrix 12, the clamp ring 16 is removed and the bar 35 is withdrawn from the cavity 24 and rotated about its longitudinal axis 180° until it is in its upside-down position disclosed in FIG. 3. The bar 35 is then re-inserted, in its upside-down position, through the entrance opening 25, longitudinally through the cavity 24 until the declining wedge surfaces 38 engage the bottom cam surface 30 of the nut member 27. Continued inward movement of the bar 35 causes the fingers 36 and 37 to cam the nut member 27 upward, thereby raising the pin holder 18 to positively disengage the cap 19 from the inner rim 13 of the matrix 12. In this position, the pin holder 18 may then be manually counter-rotated to unscrew the pin holder 18 from the nut member 27. The matrix 12 is then removed, and replaced with another matrix 12, and the pin holder 18 re-inserted and screwed through the threaded opening 28 of the nut member 27 in the manner previously described. The elongated bar 35 is withdrawn from the cavity 24 turned about its longitudinal axis to its right-side-up position again and reinserted to again cam down the nut member 27 and the pin holder 18 to lock the substituted matrix 12 in position for the next pressing.

In the preferred form of the invention, the bar 35 is held in either its right-side-up position or its upside-down position by U-shaped clamp member 43 secured to the die 10 or die support 10' by threaded bolt 44.

What is claimed is:

1. In a record pressing die having a face and a vertical center hole therethrough, a center pin holder slidably received in said center hole for vertical reciprocal movement between an upper inoperative position and a lowermost operative position, and a cap on the top portion of the center pin holder for holding a matrix on the die when the pin holder is in its lowermost operative position, the improvement comprising:

a. an elongated, substantially horizontal cavity in said die having an opening through the side of the die and intersecting the center hole below the face of the die a distance less than the length of said center pin holder, so that said pin holder depends into said cavity when inserted into the center hole,
   b. a cam member having top and bottom cam surfaces converging toward said opening and projecting laterally from said pin holder within said cavity, the distance between said cam member and said cap being greater than the distance between the top of the cavity and the face, said cam member having a height less than the height of said cavity,
   c. an elongated bar member having a wedge-shaped inner end portion, the length of said bar member being greater than the portion of the cavity between the center hole and said opening,
   d. said wedge-shaped inner end portion having a vertically sloping, operative wedge surface terminating at the inner end of said bar vertically eccentrically of the longitudinal medial axis of said bar member,
   e. said bar member being adapted to be reciprocably moved longitudinally in said cavity in a right-side-up position in which said inner end is above said top cam surface so that said wedge surface engages said top cam surface to positively force the center pin holder down in said center hole to said operative position,
   f. said bar member being adapted to be reciprocably moved longitudinally into said cavity in an upside-down position in which said inner end is below said bottom cam surface so that said wedge surface engages said bottom cam surface to positively force said center pin holder up to said inoperative position in which said cap is raised above said face to release a matrix held thereby.

2. The invention according to claim 1 in which the top surface of said inner end portion of said bar member in said right-side-up position is horizontal and slidably engages the top of said cavity.

3. The invention according to claim 2 in which said top horizontal surface in said upside-down position slidably engages the bottom of said cavity.

4. The invention according to claim 1 in which said cam member has a vertically threaded hole therethrough, said holder having an external threaded surface for threadedly engaging said threaded hole.

5. The invention according to claim 4 further comprising a stop member in said cavity a predetermined distance on the opposite side of the center hole from said opening, said distance being substantially equal to the distance between the inner end of said cam member and the center of the vertical threaded hole.

6. The invention according to claim 1 in which said wedge-shaped inner end portion is bifurcated to form spaced wedge-shaped tines adapted to be movable longitudinally on opposite sides of said center pin holder.

* * * * *